US011441884B2

(12) United States Patent
Engelmann et al.

(10) Patent No.: US 11,441,884 B2
(45) Date of Patent: Sep. 13, 2022

(54) CUT WIDTH DETERMINATION FOR A MILLING MACHINE VIA ROTOR LOADS

(71) Applicant: Caterpillar Paving Products Inc., Brooklyn Park, MN (US)

(72) Inventors: Eric S. Engelmann, Delano, MN (US); Sean Robert Laclef, Kobe (JP)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 85 days.

(21) Appl. No.: 17/122,489

(22) Filed: Dec. 15, 2020

(65) Prior Publication Data

US 2022/0187052 A1 Jun. 16, 2022

(51) Int. Cl.
*G01B 5/04* (2006.01)
*B23Q 17/10* (2006.01)
*B23Q 17/09* (2006.01)

(52) U.S. Cl.
CPC ......... *G01B 5/046* (2013.01); *B23Q 17/0966* (2013.01); *B23Q 17/10* (2013.01); *B23Q 2717/006* (2013.01)

(58) Field of Classification Search
CPC ..... B23Q 17/0966; B23Q 17/00; G01B 5/046
USPC ........................................................ 33/700
See application file for complete search history.

(56) References Cited

U.S. PATENT DOCUMENTS

| | | | |
|---|---|---|---|
| 7,905,682 B2 | 3/2011 | Holl et al. | |
| 9,863,247 B2* | 1/2018 | Von der Lippe | E21C 25/10 |
| 9,938,674 B2 | 4/2018 | Engelmann et al. | |
| 10,876,260 B2* | 12/2020 | Muir | E01C 23/088 |
| 11,180,991 B2* | 11/2021 | Haro | E21C 35/197 |
| 11,207,755 B2* | 12/2021 | Aizawa | G05B 19/0428 |
| 2013/0234494 A1 | 9/2013 | Hall et al. | |
| 2016/0040370 A1 | 2/2016 | Paulsen et al. | |
| 2020/0034793 A1 | 1/2020 | Paulsen et al. | |
| 2020/0095738 A1 | 3/2020 | Sturos | |
| 2020/0164477 A1* | 5/2020 | Isobe | G05B 19/406 |
| 2021/0299807 A1* | 9/2021 | Doy | B28D 7/00 |
| 2021/0395962 A1* | 12/2021 | Bjorge | E01C 23/088 |
| 2022/0042256 A1* | 2/2022 | Ponstein | E01C 23/088 |
| 2022/0064879 A1* | 3/2022 | Stahl | B60G 17/016 |

FOREIGN PATENT DOCUMENTS

| | | |
|---|---|---|
| AU | 2013204694 | 2/2016 |
| DE | 102011113752 | 3/2013 |
| JP | 4912764 | 1/2012 |

* cited by examiner

*Primary Examiner* — George B Bennett
(74) *Attorney, Agent, or Firm* — Schwegman Lundberg & Woessner, P.A.

(57) ABSTRACT

A milling machine can include a frame; a milling assembly coupled to the frame and including a drum housing and a cutting rotor located within the drum housing; a plurality of load detection sensors extending along a width of the cutting rotor; and a controller operatively coupled to each of the plurality of load detector sensors and configured to determine an active cut width of the cutting rotor based on load information received from the plurality of load detector sensors.

20 Claims, 4 Drawing Sheets

CUT WIDTH DETERMINATION FOR A MILLING MACHINE VIA ROTOR LOADS

TECHNICAL FIELD

The present disclosure generally relates to a milling machine. More particularly, the present disclosure relates to a milling assembly of a milling machine.

BACKGROUND

Cold planers are milling machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As power from the power source is transferred to the milling assembly, this power is further transferred to the cutting rotor, thereby rotating the cutting rotor about its axis. As the rotor rotates, its cutting bits engage the hardened asphalt, concrete, or other materials of an existing surface of a paved area, thereby removing layers of these existing structures. The spinning action of the cutting bits transfers these removed layers to the conveyor system which transports the removed material to a separate powered machine such as a haul truck for removal from a work site.

Sometimes the user needs to estimate the volume of material milled by a cold planer. Thus, it can be necessary to understand whether the cutting rotor makes a partial width cut compared to a full width cut.

U.S. Pat. No. 7,905,682 discusses a milling machine in which a signal receiving unit detects an operating condition of a machine component.

SUMMARY

In an example according to this disclosure, a milling machine can include a frame; a milling assembly coupled to the frame and including a drum housing and a cutting rotor located within the drum housing; a plurality of load detection sensors extending along a width of the cutting rotor; and a controller operatively coupled to each of the plurality of load detector sensors and configured to determine an active cut width of the cutting rotor based on load information received from the plurality of load detector sensors.

In one example, a milling assembly can include a drum housing including a discharge port; a cutting rotor located within the drum housing; and a plurality of load detection sensors extending along a width of the cutting rotor and associated with individual cutting bits of the cutting rotor; wherein the plurality of load detection sensors are operatively coupled to controller and the controller can determine an active cut width of the cutting rotor based on which of the cutting bits are under load and which cutting bits are not under load.

In one example, a method of determining the active cutting width of a cutting rotor can include positioning a plurality of load detection sensors across a width of the cutting rotor; receiving at a controller load information from each of the load detection sensors; and the controller determining active cutting width of the cutting rotor based on the load information received from the load detections sensors.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
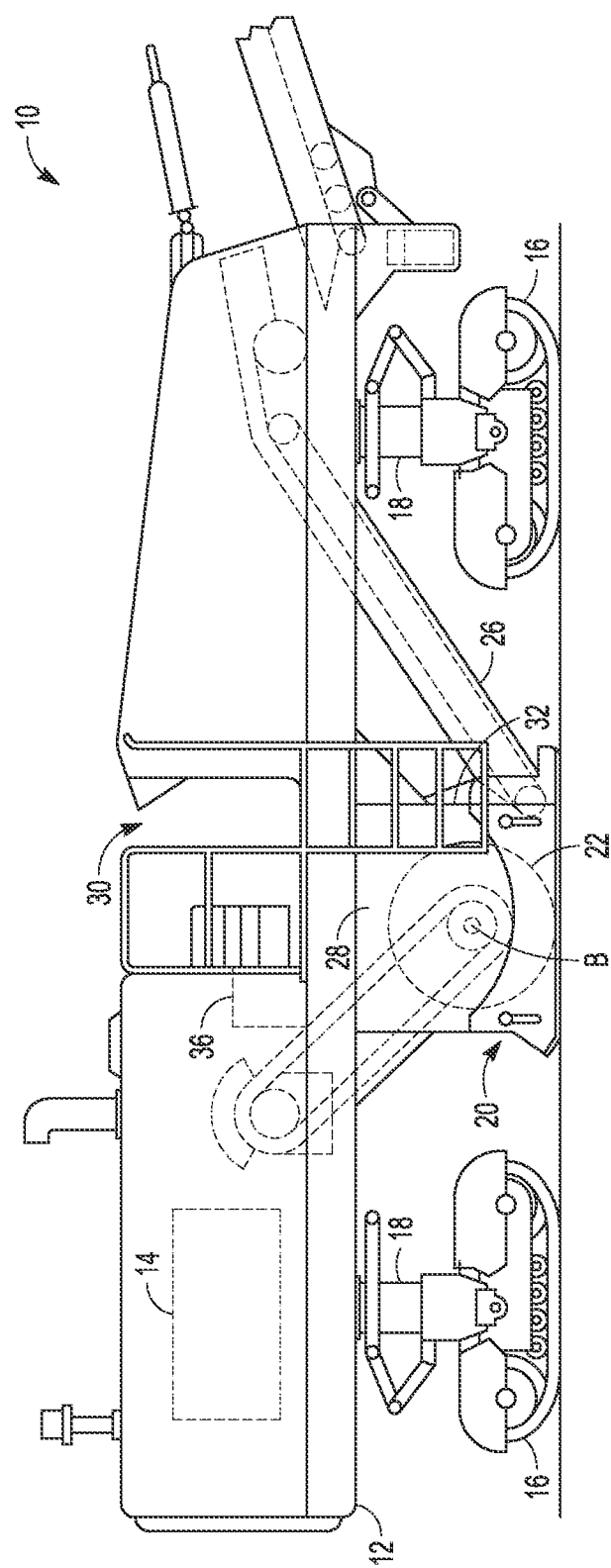
FIG. 1 shows a side view of a cold planer, in accordance with one embodiment.

FIG. 1 shows a side view of a milling machine such as a cold planer 10, in accordance with one embodiment. The cold planer 10 includes a frame 12, and a power source 14 connected to the frame 12. The power source 14 may be provided in any number of different forms including, but not limited to, Otto and Diesel cycle internal combustion engines, electric motors, hybrid engines and the like.

The frame 12 is supported by transportation devices 16 via lifting columns 18. The transportation devices 16 may be any kind of ground-engaging device that allows to move the cold planer 10 in a forward direction over a ground surface, for example a paved road or a ground already processed by the cold planer 10. For example, in the shown embodiment, the transportation devices 16 are configured as track assemblies. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum or housing axis B extending in a direction perpendicular to the frame axis. As the rotatable cutting rotor 22 spins about its drum axis B, cutting bits on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the rotatable drum 22 and its cutting bits then transfers the hardened materials to a first stage conveyor 26 via a discharge port 32 on the drum housing 28. The first stage conveyor 26 can be coupled to the frame 12 and located at or near the discharge port 32.

The drum housing 28 includes front and rear walls, and a top cover positioned above the cutting rotor 22. Furthermore, the drum housing 28 includes lateral covers on the left and right sides of the cutting rotor 22 with respect to a travel direction of the cold planer 10. The drum housing 28 is open toward the ground so that the cutting rotor 22 can engage in the ground from the drum housing 28. The drum housing includes the discharge port 32 in a front wall to discharge material to the first stage conveyor 26, which is located at or near the discharge port 32.

The cold planer 10 further includes an operator station or platform 30 including an operator interface for inputting commands to a control system, including a controller 36, for controlling the cold planer 10, and for outputting information related to an operation of the cold planer 10. The controller 36 can include combinations of hardware and software to receive, analyze, and transmit data, information, and instructions to various components of the milling machine.

The present system is related to estimating the volume of material milled by a cold planer 10. In order to estimate the volume of material milled by the cold planer 10, it can be necessary to understand whether the cutting rotor 22 rotor makes a partial width cut compared to a full width cut.

Figure 2:
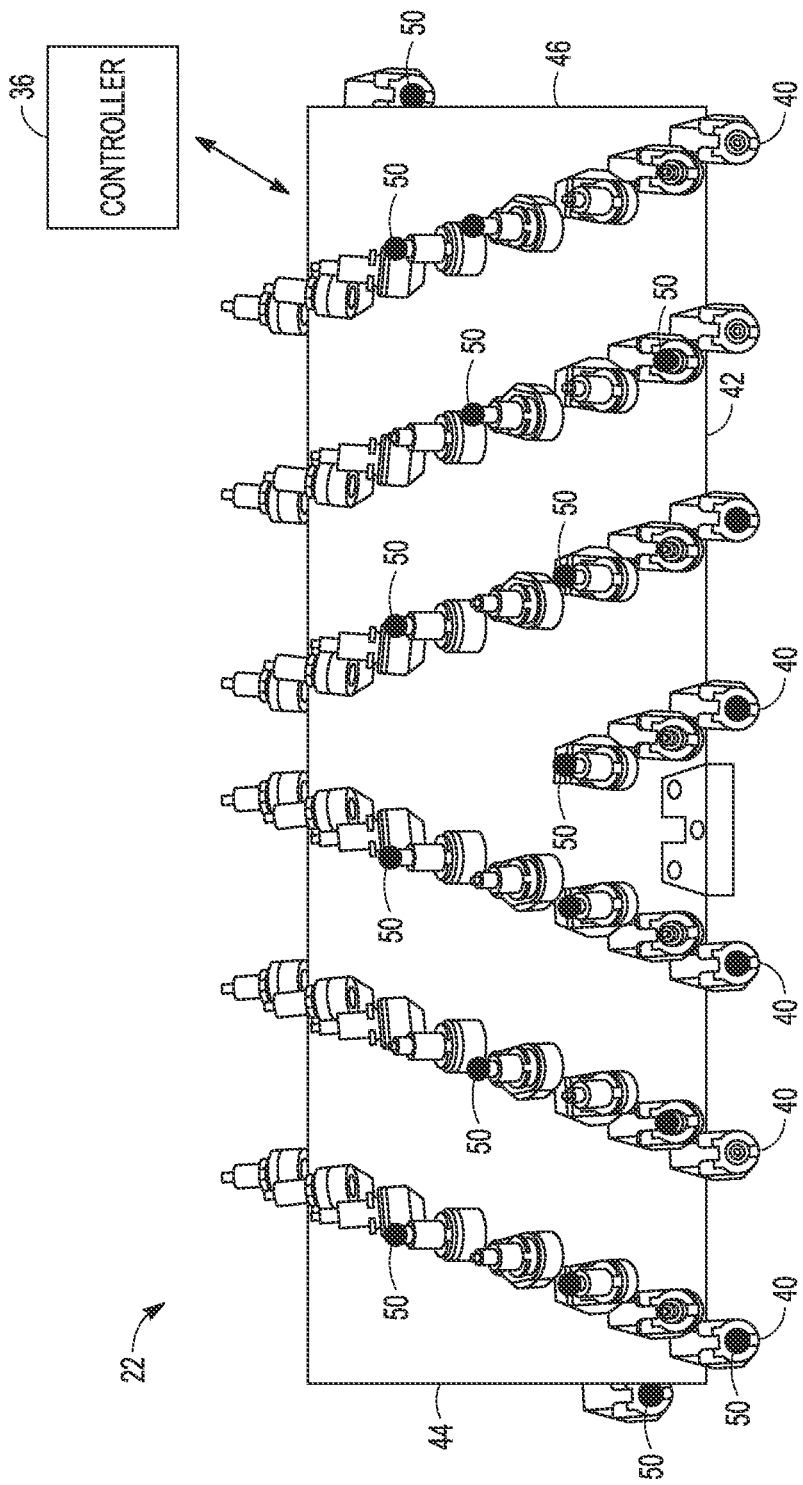
FIG. 2 shows a rear view of a cutting rotor, in accordance with one embodiment.

For example, FIG. 2 shows a rear view of the cutting rotor 22, in accordance with one embodiment. The cutting rotor 22 can include a plurality of cutting bits 40 positioned around an outer surface 42 of the cutting rotor 22. The cutting bits 40 can be located across a width of the cutting rotor 22 from a first end 44 to a second end 46 of the cutting rotor 22. In some examples, the cutting bits 40 can further cover the entire outer circumference of the cutting rotor 22.

A plurality of load detection sensors 50 can extend along a width of the cutting rotor 22. In one example, the plurality of load detection sensors 50 extend from the first end 44 to the second end 46 of the cutting rotor. Thus, the load detection sensors 50 can cover across the entire face of the cutting rotor 22. In one example, the plurality of load detection sensors 50 extend across the cutting rotor at a density of approximately 2-5 sensors per foot. In other example, there can be more or less sensors depending on a desired resolution. Thus, for a 6.5 foot cutting rotor, the system can include between 13 to 34 load detection sensors 50. The load detection sensors 50 can be just along one face of the cutting rotor 22 or positioned variously around the entire circumference.

The plurality of load detection sensors 50 can include strain gauges, for example. The load detection sensor can be any transducer that converts an input mechanical load, weight, tension, compression, or pressure into an electrical output signal.

The controller 36 can be operatively coupled to each of the plurality of load detection sensors 50 and configured to determine an active cut width of the cutting rotor 22 based on the location of each of the load detection sensors 50 and the load information received from the plurality of load detector sensors 50.

Thus, the system provides a cutting rotor that is instrumented to detect which load detection sensors are under load and which are not. By using strain gauges or other load sensing devices, the system can know the location of the load detection sensors 50 that are under load during a cut, and from this information, determine the width of the area that is being cut. This width information, combined with depth information from the milling machine, can then be used to calculate a cross-section of the material being removed. Further, when combined with distance and speed information from the milling machine, an area and/or volume milled may then also be calculated.

Figure 3:
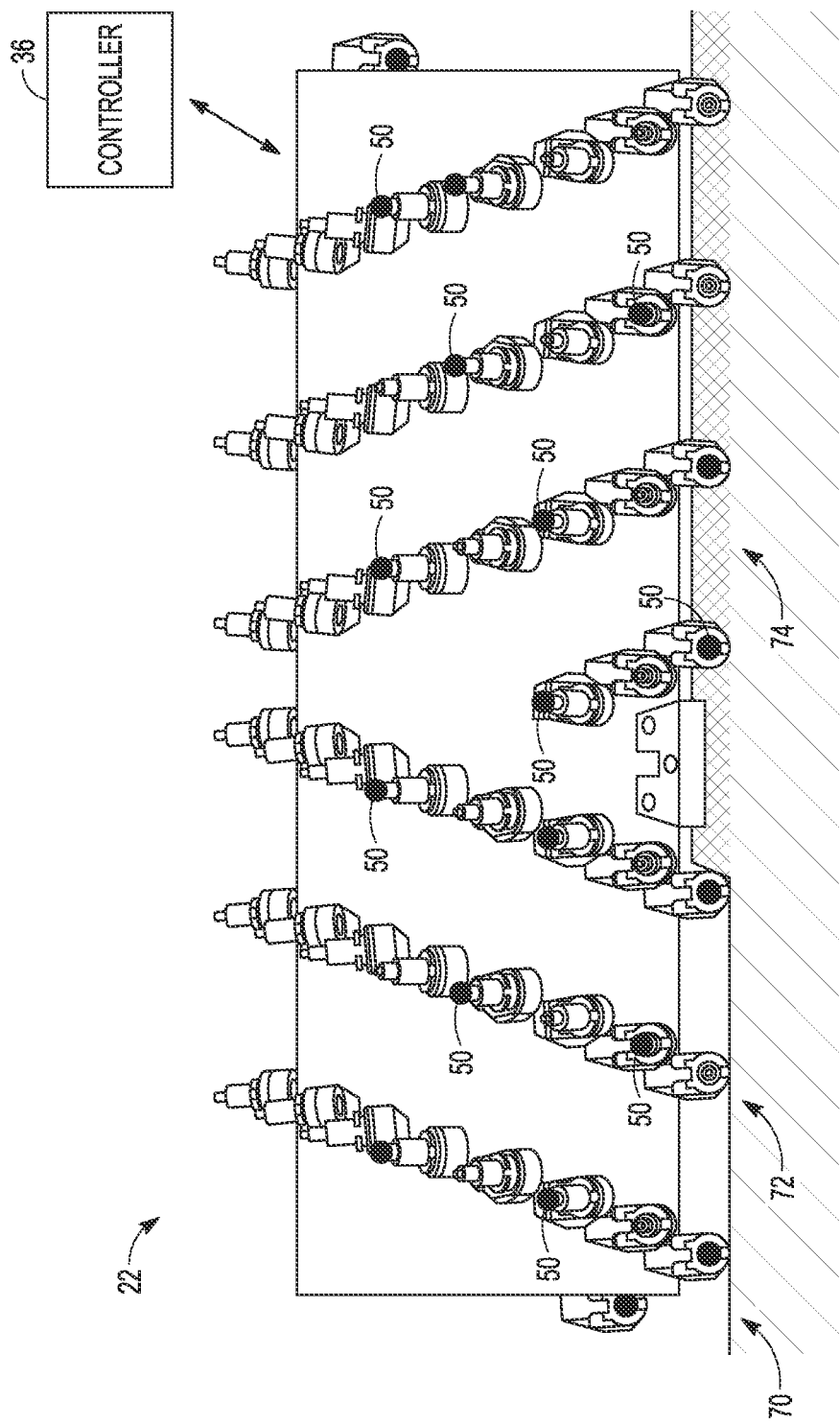
FIG. 3 shows a rear view of a cutting rotor, in accordance with one embodiment.

For example, FIG. 3 shows the cutting rotor 22 cutting a surface 70. A portion 72 of the surface 70 represent a previously cut area, while a portion 74 represent an uncut area of the surface 70. As the cutting rotor 22 rotates, the load detection sensors in portion 72 will register little to no load, while the load detection sensors 50 in portion 74 will register an elevated load.

The controller 36 receives the load information from each of the plurality of load detection sensors 50 and is configured to determine which of the plurality of load detection sensors 50 are under load and which are not under load. The controller knows the location of each of the load detection sensors 50 on the cutting rotor 22. Then, the controller 36 can determine a width of cut based on which of the plurality of load detection sensors 50 are under load and which are not under load. Knowing which sensors 50 are under load versus those that are not under load allows for a determination of the width of the actual material being cut by the cutting rotor 22.

As noted above, in further examples, the controller 36 further receives information regarding a depth of the cutting rotor 22 such that the controller 36 can determine a cross-section area of the material being removed. In further examples, the controller 36 can further receive machine speed information and cutting time information and can determine a volume of material being removed.

In one example, the load detection sensors 50 can be associated with the plurality of cutting bits 40 of the cutting rotor 22. Each of each of the plurality of load detection sensors 50 can be associated with a separate one of the plurality of cutting bits 40. A pre-determined number of the plurality of cutting bits 40 can include a load sensor configured to determine if the cutting bit 40 is under load.

Figure 4:
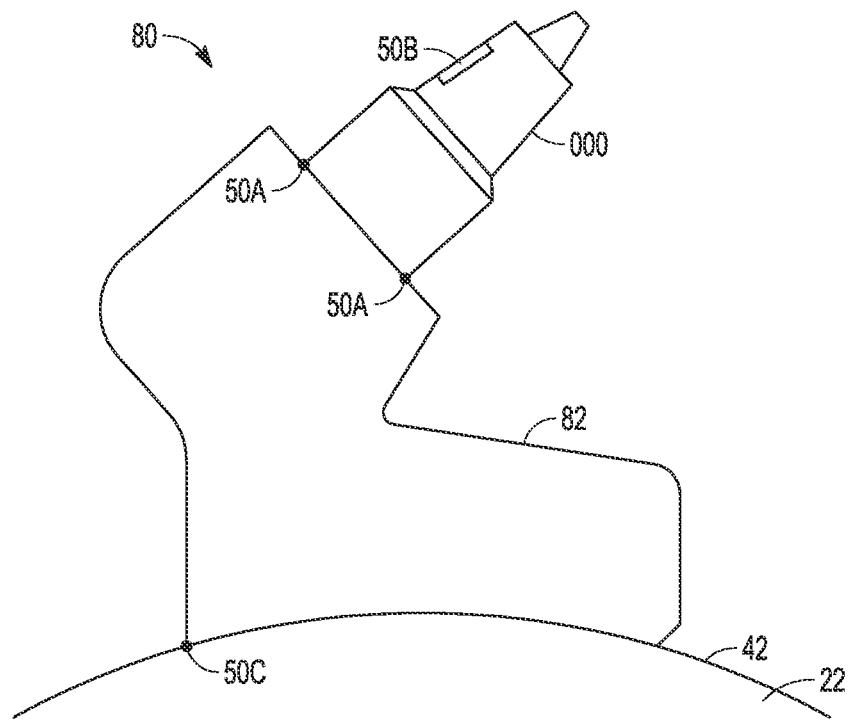
FIG. 4 shows side view of a cutting bit on a cutting rotor, in accordance with one embodiment.

For example, FIG. 4 shows a side view of a cutting bit 40 on a cutting rotor 22, in accordance with one embodiment. The cutting bit 40 is part of a cutting bit assembly 80 which further includes a tool holder 82. The load detection sensor 50 can be positioned and located to determine if the cutting bit 40 is experiencing any load or stress. Thus, in one example, a load detection sensor 50A can be located between the associated cutting bit 40 and the tool holder 82 holding the cutting bit 40. Thus, any load on the cutting bit 40 will be received by the load detection sensor 50A.

In one example, a load detection sensor 50B can be located within or on a surface of each of the plurality of the cutting bits 40. In one example, the load detection sensors 50C located on the surface 42 of the cutting rotor 22 at a base of the tool holder 82 for each of the plurality of the cutting bits 40.

Accordingly, the plurality of load detection sensors 50 can extend along a width of the cutting rotor 22 and be associated with individual cutting bits 40 of the cutting rotor 22. The plurality of load detection sensors 50 can be operatively coupled to the controller 36 and the controller can determine an active cut width of the cutting rotor 22 based on which of the cutting bits 40 are under load and which cutting bits 40 are not under load.

INDUSTRIAL APPLICABILITY

The present system is applicable to a milling assembly for a cold planer. The system can also be applicable to a reclaimer or other milling machine. In these applications it can sometimes be necessary to estimate the volume of material milled by a milling machine. Thus, it can be necessary to understand whether the cutting rotor makes a partial width cut compared to a full width cut.

Figure 5:
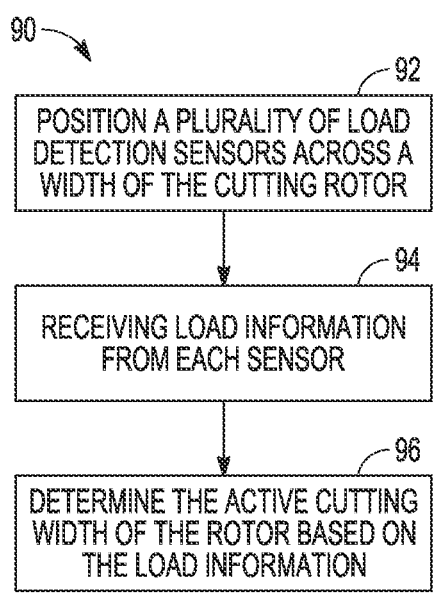
FIG. 5 shows a flow chart of a method of determining active cutting width of a cutting rotor, in accordance with one embodiment.

FIG. 5 shows a flow chart of a method 90 of determining active cutting width of a cutting rotor, in accordance with one embodiment. The method 90 can include a step 92 of positioning a plurality of load detection sensors across a width of the cutting rotor. The method can further include the step 94 of receiving at a controller load information from each of the load detection sensors. The method 90 can further include the step 96 of the controller 36 determining active cutting width of the cutting rotor 22 based on the load information received from the load detections sensors 50.

In further example, as discussed above, the controller 36 can include information regarding a location of each of the load detection sensors 50 on the cutting rotor 22 such that the controller 36 can determine a width of cut based on which of the plurality of load detection sensors 50 are under load and which are not under load.

The cutting rotor 22 can include a plurality of cutting bits 40 and wherein each of the plurality of load detection sensors 50 can be associated with a separate one of the plurality of cutting bits 40. In one embodiment, the plurality of load detection sensors extend 50 can extend across a length of the cutting rotor 22 at a density of approximately 2-5 load detection sensors 50 per foot. As noted above, many more or less detection sensors 50 can be utilized, as desired.

The width of cut information, combined with depth information from the machine, may then be used to calculate a cross-section of the material being removed. Further, when combined with distance and speed information from the machine, an area and/or volume milled may then also be calculated.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A milling machine comprising:
   a frame;
   a milling assembly coupled to the frame and including a drum housing and a cutting rotor located within the drum housing;
   a plurality of load detection sensors extending along a width of the cutting rotor; and
   a controller operatively coupled to each of the plurality of load detector sensors and configured to determine an active cut width of the cutting rotor based on load information received from the plurality of load detector sensors.

2. The milling machine of claim 1, wherein the cutting rotor includes a plurality of cutting bits and wherein each of the plurality of load detection sensors are associated with a separate one of the plurality of cutting bits.

3. The milling machine of claim 2, wherein each of the load detection sensors is located between the associated cutting bit and a tool holder holding the cutting bit.

4. The milling machine of claim 2, wherein each of the load detection sensors is located within or on a surface of each of the plurality of the cutting bits.

5. The milling machine claim 2, wherein each of the load detection sensors is located on a surface of the cutting rotor at a base of a tool holder for each of the plurality of the cutting bits.

6. The milling machine of claim 1, wherein the plurality of load detection sensors extend from a first end to a second end of the cutting rotor.

7. The milling of claim 6, wherein the plurality of load detection sensors extend across the cutting rotor at a density of approximately 2-5 sensors per foot.

8. The milling machine of claim 1, wherein the plurality of load detection sensors include strain gauges.

9. The milling machine of claim 1, wherein the controller receives the load information from each of the plurality of load detection sensors and is configured to determine which of the plurality of load detection sensors are under load and which are not under load, and the controller having information regarding a location of each of the load detection sensors on the cutting rotor, the controller can determine a width of cut based on which of the plurality of load detection sensors are under load and which are not under load.

10. The milling machine of claim 1, wherein the controller further receives information regarding a depth of the cutting rotor such that the controller can determine a cross-section area of the material being removed.

11. The milling machine of claim 10, wherein the controller further receives machine speed information and cutting time information and is configured to determine a volume of material being removed.

12. A milling assembly comprising:
    a drum housing including a discharge port;
    a cutting rotor located within the drum housing; and
    a plurality of load detection sensors extending along a width of the cutting rotor and associated with individual cutting bits of the cutting rotor;
    wherein the plurality of load detection sensors are operatively coupled to controller and the controller can determine an active cut width of the cutting rotor based on which of the cutting bits are under load and which cutting bits are not under load.

13. The milling assembly of claim 12, wherein each of the load detection sensors is located between the associated cutting bit and a tool holder holding the cutting bit.

14. The milling assembly of claim 12, wherein each of the load detection sensors is located within or on a surface of each of the plurality of the cutting bits.

15. The milling assembly claim 12, wherein each of the load detection sensors is located on a surface of the cutting rotor at a base of a tool holder for each of the plurality of the cutting bits.

16. The milling assembly of claim 4, wherein the plurality of load detection sensors extend across the cutting rotor at a density of approximately 2-5 sensors per foot.

17. A method of determining the active cutting width of a cutting rotor, the method comprising:
    positioning a plurality of load detection sensors across a width of the cutting rotor;
    receiving at a controller load information from each of the load detection sensors; and
    the controller determining active cutting width of the cutting rotor based on the load information received from the load detections sensors.

18. The method of claim 17, wherein the controller having information regarding a location of each of the load detection sensors on the cutting rotor such that the controller can determine a width of cut based on which of the plurality of load detection sensors are under load and which are not under load.

19. The method of claim 17, wherein the cutting rotor includes a plurality of cutting bits and wherein each of the plurality of load detection sensors are associated with a separate one of the plurality of cutting bits.

20. The method of claim 17, wherein the plurality of load detection sensors extend across the cutting rotor at a density of approximately 2-5 sensors per foot.

* * * * *